United States Patent [19]
Shi

[11] Patent Number: 5,950,142
[45] Date of Patent: Sep. 7, 1999

[54] MONITORING TENSION IN TENSIONED LONGITUDINALLY MOVING ELONGATE ELEMENTS

[75] Inventor: Hong Shi, Shouthampton, United Kingdom

[73] Assignee: Pirelli General plc, United Kingdom

[21] Appl. No.: 08/840,945

[22] Filed: Apr. 21, 1997

[30] Foreign Application Priority Data

Apr. 30, 1996 [GB] United Kingdom .................. 9608814

[51] Int. Cl.⁶ .................................................. G01N 21/00
[52] U.S. Cl. ................................ 702/42; 702/43; 702/76; 702/142; 73/796
[58] Field of Search ................................... 702/42, 34, 35, 702/40, 43, 49, 75–77, 79, 134, 142, 150, 176, 183, 189, 194, 157; 364/469.01, 470.13, 470.14, 578, 462.08; 356/73.1, 32, 429, 430; 250/559.24, 559.26, 559.29, 559.32, 559.01, 559.13, 559.43, 231.1; 65/381, 382, 384, 385, 377, 378, 480, 484–487, 160, 162, DIG. 13; 73/159, 160, 862.41, 579, 581, 760, 781, 787–789, 796, 826, 862.07, 391, 862.42

[56] References Cited

U.S. PATENT DOCUMENTS

| | | | |
|---|---|---|---|
| 4,692,615 | 9/1987 | Mensah et al. | 356/73.1 |
| 5,079,433 | 1/1992 | Smith | 250/559.24 |
| 5,228,893 | 7/1993 | Smithgall et al. | 65/377 |
| 5,295,086 | 3/1994 | Kumazawa et al. | 702/76 |
| 5,443,610 | 8/1995 | Urnuti | 65/486 |
| 5,602,761 | 2/1997 | Spoerre et al. | 702/183 |
| 5,639,968 | 6/1997 | Bobb et al. | 73/760 |
| 5,710,432 | 1/1998 | Bell | 250/559.32 |

OTHER PUBLICATIONS

Journal of Lightwave Technology, vol. 9, No. 8, Aug. 1991, New York, US pp. 945–947—Noncontact Measurement of Optical Fiber Draw Tension.

*Primary Examiner*—Hal Dodge Wachsman
*Attorney, Agent, or Firm*—Norris Mc Laughlin & Marcus; L. P. Brooks

[57] ABSTRACT

The tension in an optical fiber being drawn from a preform is monitored by sensing its motion transverse to the drawing direction and analysing the sensed motion using an autoregressive time-series model to provide a power spectrum. One of the peaks of the spectrum is identified as associated with the fundamental natural frequency of the drawn fiber and the frequency of that peak is used in a calculation of the tension of the fiber.

17 Claims, 4 Drawing Sheets

MONITORING TENSION IN TENSIONED LONGITUDINALLY MOVING ELONGATE ELEMENTS

FIELD OF THE INVENTION

This invention relates to monitoring tension in a tensioned longitudinally moving elongate element. The invention is particularly, although not exclusively, applicable when the elongate element is an optical fibre and is especially useful when the elongate element is a bare optical fibre being drawn from a preform.

BACKGROUND

The drawing tension is a critical parameter in the production of optical fibres. Fibre tension has generally been monitored mechanically by measuring the deformation of the fibre in response to a force applied transversely to the direction of movement of the fibre. Specifically, a three wheel strain gauge has been used wherein two wheels are applied to one side of the fibre and third wheel is applied to the other side of the fibre during the start-up of the fibre drawing process. The location of the third wheel relative to the first two wheels is used as a measure of the tension in the fibre. This method has numerous disadvantages. It is difficult to precisely align the device with the fibre so as not to change the original path of the fibre. Contact of the three wheel device with the fibre affects the on-line fibre diameter feedback loop so as to degrade diameter control. Also, the moving fibre can break when contacted by the three wheel device and in this connection this method cannot be used at drawing speeds now obtainable because of fibre breakage problems.

It is therefore desirable to provide a non-contact method of monitoring tension in a fibre being drawn from a preform.

An article entitled 'An On-Line Fiber Drawing Tension and Diameter Measurement Device' in the Journal of Lightwave Technology, Vol. 7, No. 2, February 1989 discloses a method of measuring tension which interrogates the fibre transversely during drawing with unpolarized light and then uses the retardation of the scattered light beams to determine draw tension and diameter. Although this method does not contact the fibre, the accuracy is degraded by movement of the fibre within the field of the optics, residual thermal stress, and elipticity of the outer diameter. Because of the sensitivity of the technique to any elipticity, it cannot be used on stress birefringent polarization maintaining fibres, which have large, asymmetric stress regions. Furthermore, twist is often induced in fibres during drawing, and this technique would be especially sensitive to rotation of the ellipse caused by changes in the fibre twist.

Another non-contact method which has been proposed is based on the vibration mode of the drawn fibre which is related to the tension applied to the drawn fibre.

In this connection for a flexible fibre of mass $\mu$ per unit length stretched under tension F. taking the x-axis as the undeflected position of the fibre and assuming a small lateral deflection y of the fibre which is at right angles to the x axis, the change in tension with deflection is negligible and can be ignored, and the equation of motion for the element in the y-direction is:

$$F \frac{\partial^2 y}{\partial x^2} + f(x, t) = \mu \frac{\partial^2 y}{\partial t^2} \qquad (1)$$

where f(x,t) is the magnitude per unit length of any externally applied force.

If the fibre is stretched between two fixed points with distance 1 between them, the boundary conditions are y(0, t)=y(1,t)=0 and f(x,t)=0. The solution will contain many of the normal modes and the equation for the displacement may be written as:

$$y(x, t) = \sum_{n=1}^{\infty} (C_n \sin\omega_n t + D_n \cos\omega_n t) \sin\frac{n\pi x}{l} \qquad (2)$$

$$\omega_n = \frac{n\pi}{l}\sqrt{\frac{F}{\mu}}, \qquad n = 1, 2, 3 \qquad (3)$$

Each n represents a normal-mode vibration with natural frequency determined from the equation:

$$f_n = \frac{n}{2l}\sqrt{\frac{F}{\mu}}, \qquad n = 1, 2, 3 \qquad (4)$$

$C_n$ and $D_n$ depend on the boundary conditions and the initial conditions.

For a flexible fibre, moving at a constant longitudinal velocity, the natural resonance frequency is given by:

$$f_n = \frac{n}{2l}\sqrt{\frac{F}{\mu}}\left(1 - v\frac{\mu}{F}\right) \qquad n = 1, 2, 3 \qquad (5)$$

where v is the speed of the longitudinal motion of a fibre.

The effect of speed is negligible in practice and equation (4) provides a satisfactory relationship between natural frequency and tension.

Derivable from equation for n=1 is the relationship between tension, fundamental frequency and fibre diameter:- $F=\alpha+\beta d^2 f^2$ -(4A) where d is the diameter of the drawn fibre and $\alpha$ and $\beta$ are experimentally determined constraints.

U.S. Pat. No. 4,692,615 discloses a method based on the vibration mode of the drawn fibre in which the tension in a moving fibre is monitored by sensing vibration motion of the fibre in a direction transverse to the direction in which the fibre is moving. Analysis of the vibration motion by Fast Fourier Transform (FFT) analysis is used to determine at least one frequency component thereof, and the determined frequency component is monitored so as to provide the tension readout in the fibre. However, measuring the frequency response of the fibre to either vibrations within the fibre due to the drawing process or to an intentional perturbation of the fibre position by puffs of air has certain disadvantages. Vibrations in the fibre can be caused by building and apparatus vibrations, preform feed motor instabilities, fibre drawing motor instabilities and/or polymer coating application instabilities, to mention a few. Whilst some of these vibrations, such as building vibrations, would remain constant in frequency and, therefore, are relatively easy to identify, sources such as motor noises would increase in frequency with drawing speed and are much more difficult to isolate from the fundamental fibre vibration. Also, quick puffs of air which are used to cause additional vibration of the fibre can cause fibre diameter feedback loops to become unstable and result in fibre diameter excursions.

U.S. Pat. No. 5,079,433 also discloses a method based on the vibration mode of the drawn fibre in which the motion of the fibre is sensed in a direction transverse to the direction in which the fibre is moving. The sensed movement is analysed by FFT analysis to determine a plurality of frequency components thereof and the fundamental natural frequency of the drawn fibre is identified by a complex procedure which involves identifying the highest peaks of the power spectrum obtained from the FFT analysis and analysing those peaks for the presence of a second harmonic. Using this method, it can be very difficult to extract the basic frequency which relates to tension in the fibre. This is due to the effect of noise, present in the fibre vibration signal, which under certain circumstances, has a second harmonic in the same frequency band.

Figure 1:
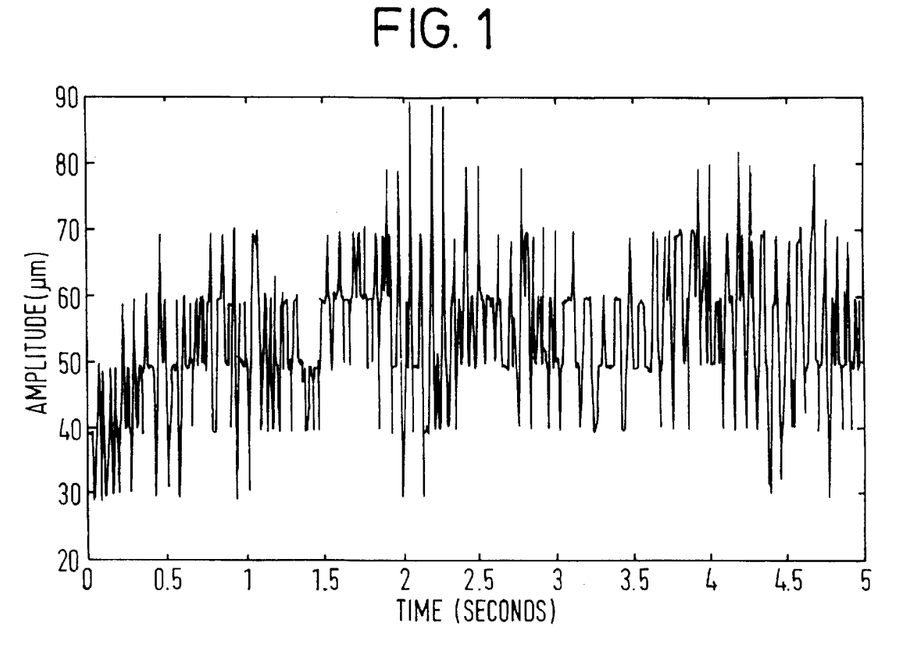
FIG. 1, to which reference has already been made, shows sensed fibre vibration during fibre drawing using an apparatus as shown in FIG. 4.
Figure 2:
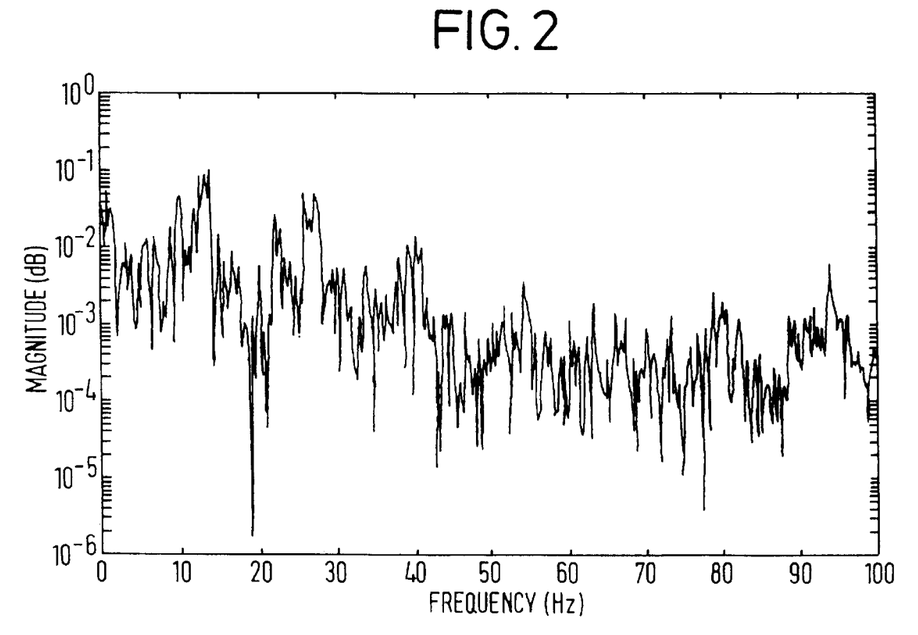
FIGS. 2 and 3, to which reference has also already been made, show respectively the power spectrum of the fibre vibration shown in FIG. 1 using Fast Fourier Transform analysis as disclosed in the prior art and using an autoregressive time-series model in accordance with the present invention.

The use of a FFT analysis to obtain the power spectrum suffers from leakage which is caused by truncation of the time-series record. The leakage problem becomes particularly acute for short data records where the Uncertainty Principle based on the product of resolution bandwidth and signal duration does not allow good frequency resolution. In the fibre drawing process, any external excitation to the drawn fibre is not allowed. FIG. 1 shows the typical fibre vibration signal obtained during the fibre drawing process. FIG. 2 shows the power spectrum of the fibre vibration using FFT analysis. The fibre resonance is difficult to identify in the vibration of the drawn fibre due to the leakage and some noise from external vibrations such as motor instabilities, building and preform vibrations. In some cases, the amplitude of the vibration caused by external sources is bigger than that caused by fibre resonance.

As will be appreciated from FIG. 2, even if it were known that the natural frequency of the drawn fibre fell within a narrow band of, say, 10 Hz it would still be impossible to identify which peak of the spectrum related to the natural frequency.

One object of the present invention is to overcome this problem associated with analysing the sensed motion using a FFT. Broadly, this is achieved by analysing the sensed motion of the drawn fibre transverse to its drawing direction using a time-series model.

It is possible to derive the mathematical model for a dynamic system based on physical laws, and this enables us to calculate the value of some time-varying quantity at any particular instant of time. A model which makes exact calculation possible would be entirely deterministic. However, very few dynamic systems are totally deterministic because changes due to unknown or unquantified effects may take place during the process. It is thus convenient to construct stochastic models that may describe the dynamics of systems. A time-series modelling technique uses discretely sampled data at the input/output of a physical system to develop the stochastic model. In this way, the characteristics of the system can be studied from the behaviour of measured data. Time-series models can also be transformed into the frequency domain in which spectral analysis can be implemented. Using time-series model estimation for the power spectral density gives a smoother curve than that obtained with a FFT without the leakage problem and also a narrower bandwidth for the resonance peaks. For the general multi-input single-output linear model structure:

$$y[n] = -\sum_{k=1}^{p} a[k]y[n-k] + \sum_{k=0}^{q} b[k]u[n-k] + e[n] \tag{6}$$

where y[n] is the output signal, u[n] is the input signal, a[k] and b[k] are parameters of time-series model, and e[n] is a white noise.

The input signal u[n] of the measured system is not usually available for purposes of spectral analysis. For the drawn fibre vibration, its input signal is unmeasured and its output is the motion in the transverse direction, and an autoregressive model is appropriate.

In a p-th order autoregressive (AR) model for time-series y(n), where n is the discrete time index, the current value of the measurement is expressed as a linear combination of p previous values:

$$y[n] = e[n] - \sum_{k=1}^{p} a[k]y[n-k] \tag{7}$$

where e[n] designates a white noise. In this case, y[n] is the measured position signal of bare fibre in the transverse direction and a[k] are the model parameters.

The frequency characteristic analysis can be obtained by the autopower spectral density. The AR power spectral density is given by:

$$P_{AR}(f) = \frac{T\rho_\omega}{|A(f)|^2} \tag{8}$$

where:

$$A(f) = 1 + \sum_{k=1}^{p} a[k]\exp(-j2\pi f kT) \tag{9}$$

and T is the sampling interval. $P_\rho$ is the white noise variance.

Figure 3:
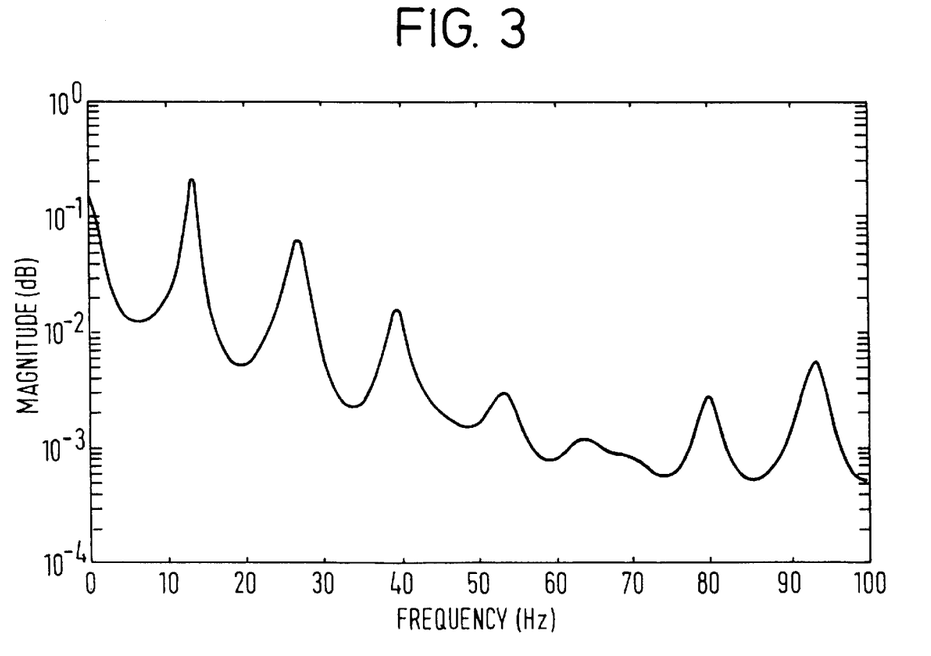

FIG. 3 shows the power spectrum of the fibre vibration obtained using the time-series analysis method. The vibration signal is the same signal as that in FIG. 1. It can be seen that the curve of the spectrum is smoother than that in FIG. 2 and without the leakage problem.

SUMMARY OF THE INVENTION

In accordance with the invention, there is provided a non-contact method of monitoring the tension in a tensioned longitudinally moving elongate element in which motion of the element transverse to its direction of longitudinal movement is sensed and the sensed motion is analysed to determine a natural frequency of the tensioned element which determined natural frequency is used for monitoring said tension, wherein the sensed motion is analysed using an autoregressive time-series model to provide a power spectrum having a plurality of peaks and the frequency of one of the peaks thereof, which peak is identified as associated with said natural frequency, is selected as said natural frequency.

There are numerous ways of identifying the peak associated with the natural frequency of the tensioned element in order to determine that frequency from the power spectrum provided by the autoregressive time-series model of the sensed motion of the tensioned element, but the presently preferred way comprises monitoring said power spectrum over a range of speeds of said longitudinal movement, noting the frequency of a peak which shifts with changes of speed throughout said range, establishing a relationship between the frequency of said peak and the speed of said movement, using said relationship to ascertain the expected frequency of the peak for the speed of longitudinal movement of the element whose tension is being monitored, and choosing the peak having a frequency closest to said expected frequency as said identified peak.

Preferably a peak having a frequency within a band about said expected frequency is chosen as said identified peak. For example, the band may be substantially centred about said expected frequency and have an extent of about 10 Hz.

An alternative way of identifying the peak of interest which also relies on the shifting of the peak(s) associated with the natural frequency of the tensioned element, comprises monitoring said power spectrum whilst the speed of longitudinal movement of the element is changed and choosing a peak which shifts with changes with said speed as said identified peak.

Since it has the largest magnitude, it is expedient to determine the fundamental frequency of the tensioned element in the method of the invention, however, it is to be appreciated that instead a harmonic of the fundamental frequency may be determined.

Although the autoregressive time-series model detailed above is presently preferred, it is envisaged that an autoregressive moving average time-series model may be used in carrying out a method within the scope of the invention.

It will be appreciated that monitoring the natural frequency of the tensioned element also monitors the tension therein, in this case a measure of the tension in the elongate element is determined using the frequency which is selected. However, in situations where the cross-section is likely to change significantly with tension, preferably a measure of the cross-section of the elongate element is obtained and said measure of the tension in the elongate element is determined using the measure of the cross-section also. It will be appreciated that the latter case is applicable to drawn fibre and the measure of the cross-section thereof can be provided by using the measure of the diameter of the fibre which is usually required for process control.

The invention also includes apparatus for non-contact monitoring of the tension in a tensioned longitudinally moving elongate element, said apparatus comprising sensing means for sensing the motion of the element transverse to its direction of longitudinal movement, means arranged to analyse an output from said sensing means using an autoregressive time-series model to provide a power spectrum, means for identifying a peak of said power spectrum associated with a natural frequency of the tensioned element, and means for providing an output signal corresponding to the frequency of the identified peak.

Preferably, the apparatus also includes means for providing a relationship between the expected frequency of the peak and the speed of longitudinal movement of the element, and means for choosing the peak of the power spectrum closest to the expected frequency as the identified peak.

BRIEF DESCRIPTION OF THE DRAWINGS

In order that the invention may be well understood, an embodiment thereof, which is given by way of example only will now be described with reference to the accompanying drawings, in which.

DETAILED DESCRIPTION OF PREFERRED EMBODIMENTS

Figure 4:
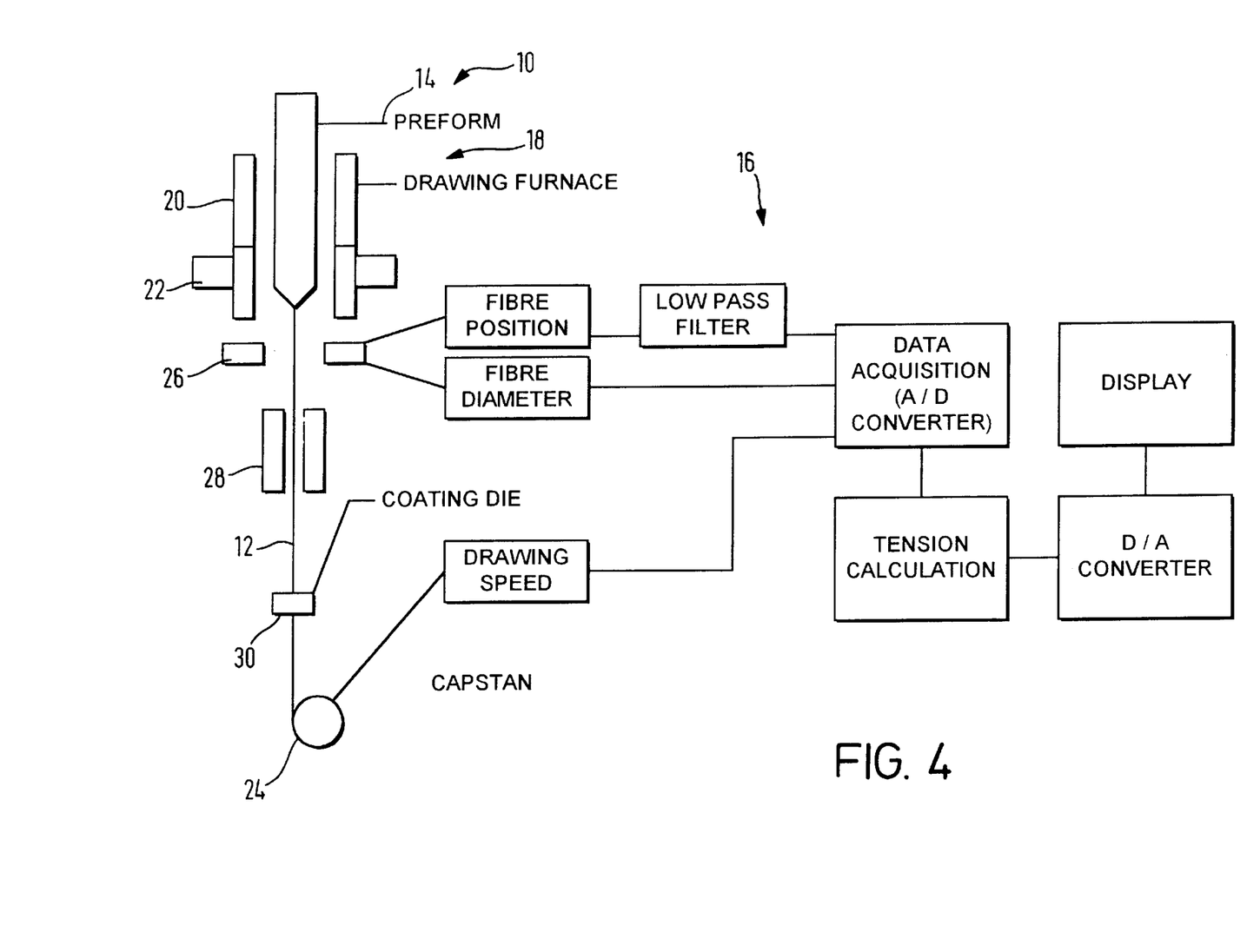
FIG. 4 is a schematic drawing of fibre drawing apparatus provided with a non-contact fibre tension measurement system.

Referring now to FIG. 4 there is shown an apparatus 10 for drawing fibre 12 from a preform 14 which is provided with a non-contact tension measurement system 16. The apparatus 10 is conventional and comprises a drawing furnace 18 having a muffle 20 in which the preform is vertically disposed. A heating element 22 heats at least the bottom portion of the preform and a fibre is drawn therefrom by a capstan 24. After leaving the muffle 20 the fibre passes through a diameter monitor 26 which provides a signal which is used in a feedback loop to control the speed of the capstan 24, and possibly also the speed of means lowering the preform in the furnace, to maintain constant fibre diameter. After the diameter monitor, the fibre passes through at least one cooling device 28 and at least one coating die 30 where a protective coating is applied to the bare fibre.

The fibre diameter monitor is an Anritsu Model M551A fibre diameter monitor for bare fibre and provides diameter and position outputs. The latter can be used to measure the vibrations of the drawn fibre. The monitor provides two position outputs relating to movement in mutually perpendicular directions transverse to the drawing direction. Only one of these outputs is required and with only one laser beam being used in one of these two directions the output for the other direction is more accurate and is used. The scanning rate of the monitor is 1000 times per second and position output is with 16 times average. Hence the frequency response is suitable for tension analysis. Based on equation (4), the fundamental natural frequency is between 1.8 Hz and 32.2 Hz corresponding to tension of 1 to 300 grams respectively. The position output signal used passes through a low-pass filter and is then digitised using a PCL-818H data acquisition card with a 200 Hz sampling rate and 1024 points. The data is stored in a Tandon PCAII 486dx/33 Computer, ready for the tension calculation. The tension value calculated, is sent to a D/A converter and finally to the display.

Figure 5:
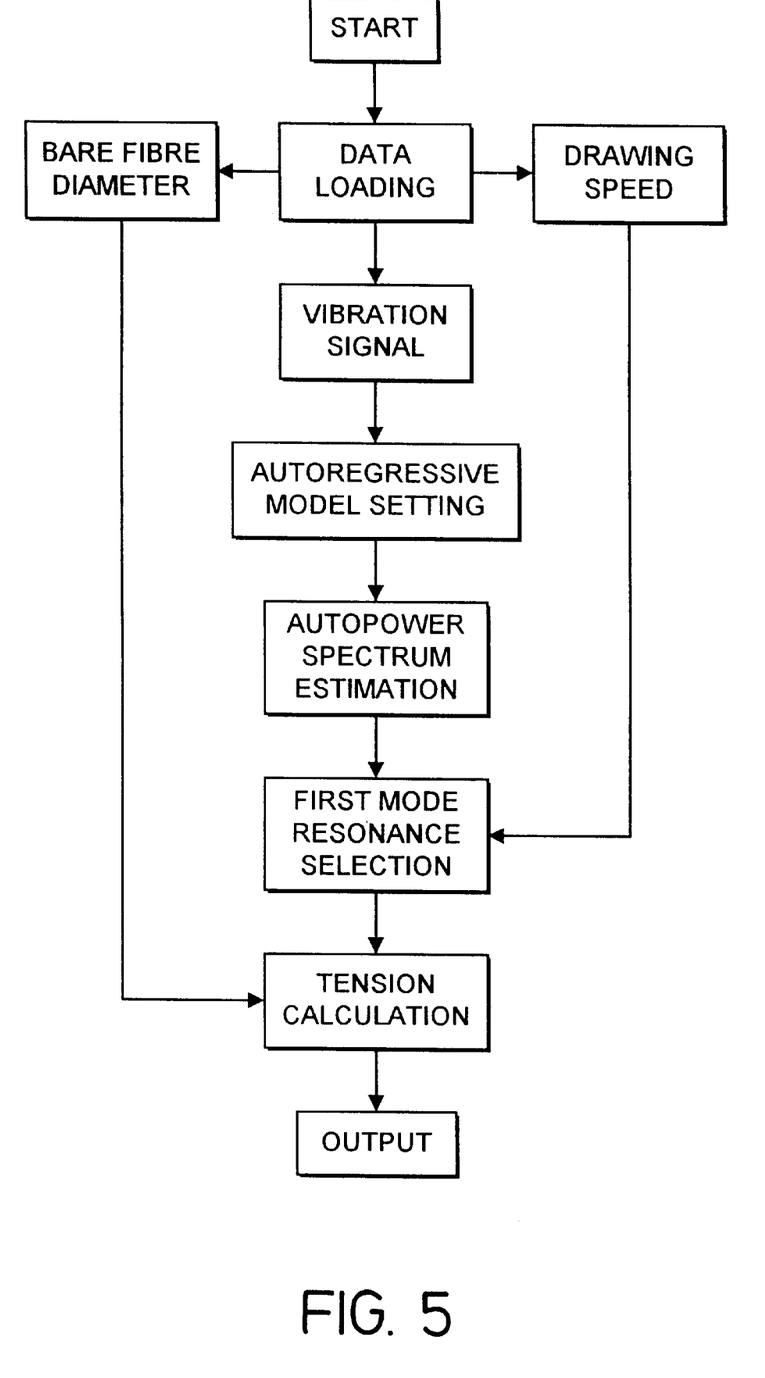
FIG. 5 is a flow diagram showing steps followed in tension calculation using the measurement system shown in FIG. 4.

FIG. 5 shows the flow diagram of the tension calculation program using the parametric method. Firstly, an appropriate parametric time-series model is used to represent the measured data record. Second an estimation of the parameters of the model is made. Then the autopower spectral density for that model can be calculated using the estimated parameters.

Based on the autopower spectrum of the fibre vibration, the first order, or fundamental, natural frequency of the drawn fibre can be obtained. This can be used for tension calculation combined with the fibre diameter.

As will be appreciated from a comparison of FIGS. 2 and 3, it is a much easier task to identify a peak in the spectrum of FIG. 3 than a peak from the spectrum of FIG. 2 as associated with the fundamental natural frequency (or a harmonic thereof) of the drawn fibre. For example, if it is known that the fundamental frequency should be within a band of say 10 Hz only one peak is likely to be in that band in FIG. 3 whereas several peaks will be within that band in FIG. 2.

Figure 6:
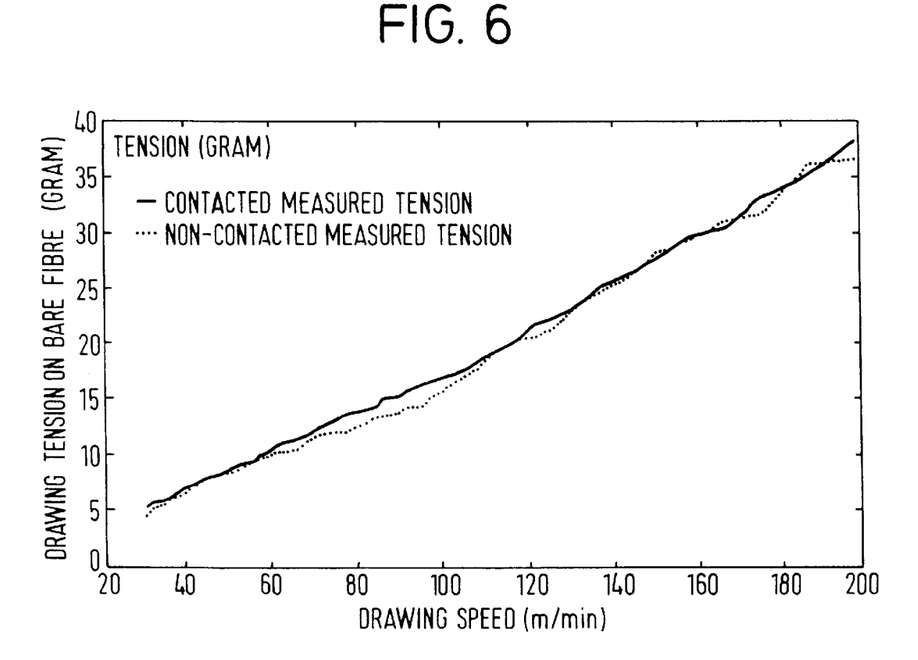
FIG. 6 shows the correlation between values of tension obtained using the embodiment of the invention and the prior art contact method over a range of drawing speeds.

A preferred method of identifying the peak associated with the fundamental frequency in FIG. 3, is to establish a relationship between the frequency of the peak and the drawing speed, since the former changes with the latter (as will be clear from FIG. 6 which shows tension which is a function of the square of the natural frequency—against speed). In order to establish this relationship a fibre is drawn at speeds extending over a range, the power spectrum of FIG. 3 is monitored to identify which peak shifts with changes in speed throughout that range, and the frequency of that peak against drawing speed over the range is stored. Then in a subsequent drawing process, under comparable conditions, the expected frequency of the peak for the drawing speed being used is determined from the stored relationship and the peak of the power spectrum having a frequency closest to the expected frequency is identified as the peak associated with the fundamental frequency of the drawn fibre and that frequency is used in the calculation of tension, as indicated in the flow chart of FIG. 5. Also as indicated in FIG. 5 the measured diameter of the fibre is used in the calculation of tension. This is in accordance with equation 4A discussed hereinbefore.

In identifying the peak associated with the fundamental frequency, it is preferred to look at a band of frequencies including the expected frequency (for example a band of about 10 Hz centred substantially at the expected frequency) and select the peak falling within that band.

Referring now to FIG. 6, values of tension obtained by the non-contact method described in connection with FIGS. 3 to 5 are compared with values of tension obtained using the previously described contact method for drawing speeds at which the contact method can be used without consistently breaking the fibre. As will be seen the correlation is excellent and as will be appreciated, the non-contact method is suitable for use at drawing speeds in excess of those shown. FIG. 6 also indicates that the fundamental frequency of the drawn fibre (which is a function of the tension thereof) varies continuously with drawing speed.

I claim:

1. Apparatus for non-contact monitoring of the tension in a tensioned longitudinally moving elongate element, said apparatus comprising:

sensing means for sensing the motion of the element in a direction transverse to the direction of the longitudinal movement of the element;

analyzing means coupled to said sensing means for providing a power spectrum using an autoregressive time series analysis;

means for identifying a peak of said power spectrum associated with an expected natural frequency of the tensioned element based on the speed of the longitudinal movement of the element; and means for providing an output signal corresponding to the frequency of the identified peak.

2. Apparatus as claimed in claim 1, including means for providing a relationship between the expected frequency of the peak and the speed of longitudinal movement of the element, and means for choosing the peak of the power spectrum closest to the expected frequency as the identified peak.

3. A method of non-contact monitoring the tension in a tensioned longitudinally moving elongate element comprising:

sensing the motion of the element in a direction transverse to the direction of the longitudinal movement of the element;

analyzing the sensed transverse motion of the element using an autoregressive time series model to provide a power spectrum having a plurality of peaks;

identifying, based on the speed of the longitudinal movement of the element, the peak associated with an expected natural frequency of the element; and determining the natural frequency of the element from the frequency of the identified peak.

4. A method as claimed in claim 3, wherein the step of identifying the peak associated with said expected natural frequency comprises monitoring said power spectrum over a range of speeds of said longitudinal movement, noting the frequency of a peak which shifts with changes of speed throughout said range, establishing a relationship between the frequency of said peak and the speed of said movement, using said relationship to ascertain the expected frequency of the peak for the speed of longitudinal movement of the element whose tension is being monitored, and choosing the peak having a frequency closest to said expected frequency as said identified peak.

5. A method as claimed in claim 4, wherein a peak having a frequency within a band about said expected frequency is chosen as said identified peak.

6. A method as claimed in claim 5, wherein said band is substantially centered about said expected frequency and has an extent of about 10 Hz.

7. A method as claimed in claim 3, wherein the step of identifying said peak comprises monitoring said power spectrum whilst the speed of longitudinal movement of the element is changed and choosing a peak which shifts with changes with said speed as said identified peak.

8. A method as claimed in claim 3, wherein said natural frequency is the fundamental frequency of the tensional element.

9. A method as claimed in claim 3, wherein said sensed motion is analysed using an autoregressive moving average time series model.

10. A method as claimed in claim 3, wherein a measure of the tension in the elongate element is determined using the natural frequency.

11. A method as claimed in claim 10, wherein a measure of the cross-section of the elongate element is obtained and wherein said measure of the tension in the elongate element is determined using the measure of the cross-section.

12. A method as claimed in claim 3, wherein said elongate element comprises an optical fibre.

13. A method as claimed in claim 12, wherein said elongate element comprises a bare optical fibre being drawn from a preform.

14. A method of non-contact monitoring the tension in a tensioned longitudinally moving elongate element comprising:

sensing the motion of the element in a direction transverse to the direction of the longitudinal movement of the element;

analyzing the sensed transverse motion of the element using an autoregressive time series model to provide a power spectrum having a plurality of peaks for a range of speeds of the longitudinal movement;

noting the frequency of a peak which shifts with changes of speed throughout the range of speeds;

establishing a relationship between the frequency of the peak and the speed of the longitudinal movement of the element; and ascertaining, based on the relationship, an expected natural frequency of a peak for the speed of the longitudinal movement of the element whose tension is being monitored;

identifying, in the power spectrum for the longitudinally moving element whose tension is being monitored, the peak having a frequency closest to the expected natural frequency; and determining the natural frequency of the element from the identified peak.

15. The method of claim 14, wherein a peak having a frequency within a band about said expected frequency is chosen as said identified peak.

16. The method of claim 15, wherein said band is substantially centered about said expected frequency and has a width of about 10 Hz.

17. A method of non-contact monitoring the tension in a tensioned longitudinally moving elongate element comprising:

sensing the motion of the element in a direction transverse to the direction of the longitudinal movement of the element;

analyzing the sensed transverse motion of the element using an autoregressive time series model to provide a power spectrum having a plurality of peaks for changes in the speed of the longitudinal movement of the element;

identifying, from the plurality of the peaks, a peak which shifts with the changes in the speed of the longitudinal movement; and determining the natural frequency of the element from the identified peak.

* * * * *

UNITED STATES PATENT AND TRADEMARK OFFICE
CERTIFICATE OF CORRECTION

PATENT NO. : 5,950,142
DATED : September 7, 1999
INVENTOR(S) : Hong Shi

It is certified that error appears in the above-indentified patent and that said Letters Patent is hereby corrected as shown below:

Title page, item [75] Inventor: "Shouthampton" should read
--Southampton--;

Col. 2, equations (3), (4) and (5), the numeral 3 should be followed by three dots, i.e." $3 \dots$ ";

Col. 4, line 26, "$P_p$" should read --$\rho_\omega$--.

Signed and Sealed this

Twenty-seventh Day of March, 2001

Attest:

NICHOLAS P. GODICI

Attesting Officer

Acting Director of the United States Patent and Trademark Office